US 8,181,868 B2

(12) United States Patent
Thomas et al.

(10) Patent No.: US 8,181,868 B2
(45) Date of Patent: *May 22, 2012

(54) SYSTEM, METHOD, APPARATUS, AND COMPUTER PROGRAM PRODUCT FOR MONITORING THE TRANSFER OF CARGO TO AND FROM A TRANSPORTER

(75) Inventors: Patrick Thomas, San Diego, CA (US); John Charles Alvarez, Rancho Palo Verdes, CA (US); Leroy E. Scheppmann, II, San Diego, CA (US)

(73) Assignee: APS Technology Group, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,764

(22) Filed: Mar. 15, 2011

(65) Prior Publication Data
US 2011/0163159 A1    Jul. 7, 2011

Related U.S. Application Data

(63) Continuation of application No. 11/734,853, filed on Apr. 13, 2007, now Pat. No. 7,922,085.

(51) Int. Cl.
*G07B 15/02* (2011.01)
*G06K 19/06* (2006.01)

(52) U.S. Cl. ........................... 235/384; 235/492

(58) Field of Classification Search .................. 235/384, 235/492, 440, 454, 455, 462.01, 462.02, 235/462.06, 462.08, 494
See application file for complete search history.

(56) References Cited

U.S. PATENT DOCUMENTS

| | | | |
|---|---|---|---|
| 3,669,288 A | 6/1972 | Young | |
| 4,068,232 A * | 1/1978 | Meyers et al. | ................. 342/44 |
| 4,264,927 A | 4/1981 | Raymond et al. | |
| 4,281,342 A | 7/1981 | Ueda et al. | |
| 4,462,045 A | 7/1984 | Norris | |
| 5,142,658 A | 8/1992 | McMorran et al. | |
| 5,152,408 A | 10/1992 | Tax et al. | |
| 5,712,789 A | 1/1998 | Radican | |
| 5,725,253 A | 3/1998 | Salive et al. | |
| 5,757,286 A | 5/1998 | Jonsson et al. | |
| 5,760,415 A | 6/1998 | Hauck et al. | |

(Continued)

OTHER PUBLICATIONS

*Fully Integrated Crane-Mounted OCR Systems*; SeeCrane Product Sheet; Hi-Tech Solutions; 4 pages; available at <http://x.htsol.com/index> (visited Aug. 4, 2009).

(Continued)

Primary Examiner — Thien M Le
(74) Attorney, Agent, or Firm — Alston & Bird LLP

(57) ABSTRACT

Systems, methods, apparatus, and computer program products are provided for monitoring the transfer of cargo, such as a shipping container, to and from a transporter, such as a truck. Identification codes are provided on the cargo and the transporter to aid in the identification of the cargo and the transporter. One or more identification code receiving devices, such as a camera, may be associated with a cargo moving apparatus, such as a crane, and configured to automatically capture the transporter identification code and the cargo identification code as the cargo is being transferred to or from the transporter. The transporter identification code and the cargo identification code can be associated with each other along with other information about the transfer in order to monitor the transfer. In this regard, identification information may be communicated to a shipping terminal's operating system to provide real-time information about one or more transfers occurring within a shipping terminal.

22 Claims, 6 Drawing Sheets

U.S. PATENT DOCUMENTS

Figure 1:
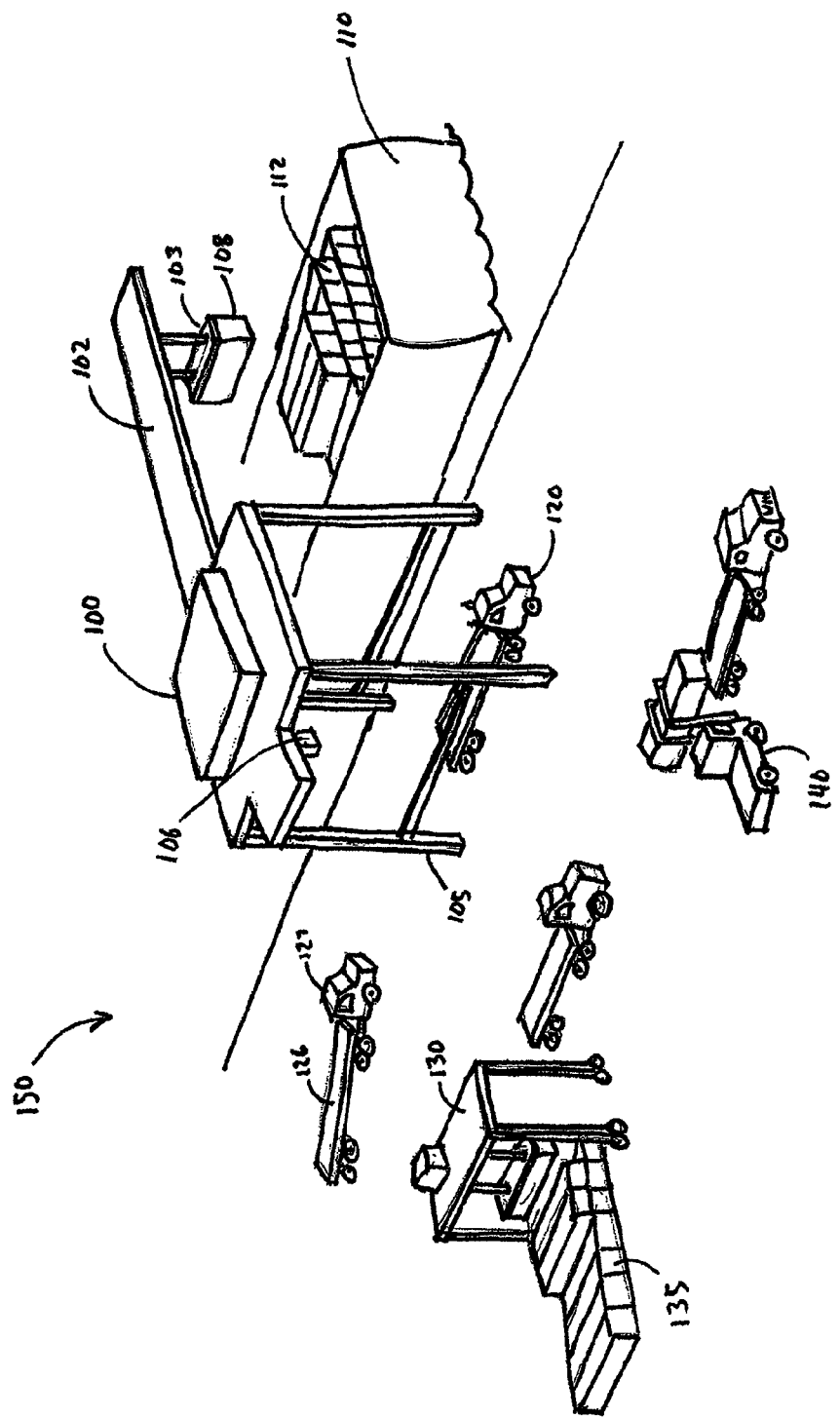

| | | | |
|---|---|---|---|
| 5,769,589 | A | 6/1998 | Lubbers |
| 5,780,826 | A | 7/1998 | Hareyama et al. |
| 5,826,825 | A | 10/1998 | Gabriel |
| 5,867,801 | A * | 2/1999 | Denny ............................ 701/35 |
| 5,953,234 | A | 9/1999 | Singer et al. |
| 5,969,333 | A * | 10/1999 | Barthelemy et al. .......... 235/492 |
| 6,026,378 | A | 2/2000 | Onozaki |
| 6,148,291 | A | 11/2000 | Radican |
| 6,256,553 | B1 | 7/2001 | Erikkilä |
| 6,332,098 | B2 | 12/2001 | Ross et al. |
| 6,356,802 | B1 | 3/2002 | Takehara et al. |
| 6,359,647 | B1 | 3/2002 | Sengupta et al. |
| 6,437,819 | B1 | 8/2002 | Loveland |
| 6,577,921 | B1 | 6/2003 | Carson |
| 6,665,585 | B2 | 12/2003 | Kawase |
| 6,768,931 | B2 | 7/2004 | Takehara et al. |
| 6,826,452 | B1 | 11/2004 | Holland et al. |
| 7,013,026 | B2 | 3/2006 | Takehara et al. |
| 7,181,312 | B2 | 2/2007 | Takehara et al. |
| 7,209,995 | B2 * | 4/2007 | Pinto et al. .................... 710/301 |
| 7,308,114 | B2 | 12/2007 | Takehara et al. |
| 7,922,085 | B2 * | 4/2011 | Thomas et al. ............... 235/384 |
| 2002/0089423 | A1 | 7/2002 | Przygoda, Jr. |
| 2002/0105578 | A1 | 8/2002 | Hunter |
| 2002/0140813 | A1 | 10/2002 | Trajkovic et al. |
| 2002/0198632 | A1 * | 12/2002 | Breed et al. ........................ 701/1 |
| 2003/0065485 | A1 | 4/2003 | Zerwekh et al. |
| 2003/0076417 | A1 | 4/2003 | Thomas et al. |
| 2003/0132854 | A1 | 7/2003 | Swan et al. |
| 2003/0190057 | A1 | 10/2003 | Takehara et al. |
| 2003/0217870 | A1 | 11/2003 | Ridling |
| 2004/0088228 | A1 | 5/2004 | Mercer et al. |
| 2004/0126015 | A1 | 7/2004 | Hadell |
| 2004/0149823 | A1 | 8/2004 | Aptekar |
| 2004/0199285 | A1 | 10/2004 | Berichon et al. |
| 2005/0027435 | A1 | 2/2005 | Scheppmann |
| 2005/0036854 | A1 | 2/2005 | Takehara et al. |
| 2005/0131574 | A1 | 6/2005 | Takehara et al. |
| 2005/0232733 | A1 * | 10/2005 | Maurer et al. ................. 414/334 |
| 2005/0256608 | A1 | 11/2005 | King et al. |
| 2006/0018735 | A1 | 1/2006 | Takehara et al. |
| 2006/0158338 | A1 | 7/2006 | King et al. |
| 2006/0208169 | A1 | 9/2006 | Breed et al. |
| 2008/0063280 | A1 | 3/2008 | Hofman et al. |
| 2010/0264728 | A1 * | 10/2010 | Rickrode .................... 307/10.2 |

OTHER PUBLICATIONS

*Automated Terminal Gate OCR Systems*; SeeGate Product Sheet; Hi-Tech Solutions; 5 pages; available at <http://x.htsol.com/index> (visited Aug. 5, 2009).

*Automated Terminal Rail OCR Systems*; SeeTrain Product Sheet; Hi-Tech Solutions; 4 pages; available at <http://x.htsol.com/index> (visited Aug. 5, 2009).

*SeeCrane*; SeeContainer Product Line; Dalosy Industrial Systems/ Hi-Tech Solutions Europe; 3 pages; available at <http://www.dis-bv.com/seecrane.htm> (visited Aug. 5, 2009).

Phil Elovic, Lee Scheppmann; *Practicalities of Implementing OCR: A Case Study of the World's Largest Installation*; Presented at TOC 2002 Americas, Miami, Florida; Nov. 21, 2002; 8 pages; TOC2002 Americas.

APS Technology Group, Inc., Sattel; *Case Study: APM Terminals Pier 400—Los Angeles, CA*; APM Terminals; Apr. 6, 2006; 3 pages.

*SeeCrane Crane Mounted Recognition System*; SeeCrane Container Recognition System; Hi-Tech Solutions; 5 pages; available at <http://www.htsol.com/Products/SeeCrane> (visited Jul. 31, 2009).

International Search Report for International Application No. PCT/US08/59824, mailed Jun. 30, 2008.

* cited by examiner

SYSTEM, METHOD, APPARATUS, AND COMPUTER PROGRAM PRODUCT FOR MONITORING THE TRANSFER OF CARGO TO AND FROM A TRANSPORTER

CROSS-REFERENCE TO RELATED APPLICATIONS

This application is a Continuation of U.S. patent application Ser. No. 11/734,853, filed Apr. 13, 2007, now U.S. Pat. No. 7,922,085 which is hereby incorporated herein in its entirety by reference.

FIELD OF EMBODIMENTS OF THE INVENTION

Embodiments of the present invention relate generally to systems, methods, apparatus, and computer program products for monitoring the transfer of cargo, such as a shipping container, to and from a transporter, such as a vehicle.

BACKGROUND OF EMBODIMENTS OF THE INVENTION

The ability to track and locate shipping containers or other cargo within a terminal, such as a marine, rail, or intermodal terminal, is critical to the operation of the terminal. For example, FIG. 1 illustrates a typical operation of unloading containers from a ship 110 or other vessel at a marine terminal 150. In the illustrated operation, the ship 110 arrives at the port laden with a stack of shipping containers 112 or other cargo. A quay crane 100 or other crane device removes the containers from the ship 110. In this regard, the quay crane 100 may include a crane boom 102 and a support structure 105 for supporting the crane boom 102. The quay crane 100 may also include an operator booth 106 in which an operator sits when operating the quay crane 100. The quay crane 100 has a headblock 103 suspended from the crane boom 102 by one or more cables. The headblock 103 can be raised and lowered vertically from the crane boom 102 and can be moved laterally (i.e., horizontally) along the crane boom 102. The headblock 103 is configured such that it may capture a container 108 from the stack of containers 112 on the ship 110. The headblock 103 with the container 108 is then raised above the ship 110 and moved laterally so that the container 108 is suspended over the ground.

Typically, the operation of unloading containers from the ship 110 involves transferring containers from the ship 110 to other vehicles, such as to a truck chassis 126 or "bomb cart" pulled by a utility tractor rig (UTR) 127. In this regard, the operation may involve the quay crane 100 placing the container 108 on the ground proximate to the crane 100 where a second smaller and more mobile crane or other moving apparatus may transfer the container 108 from the ground to the truck chassis 126 or to another location in the terminal 150. In other operations, such as in the illustrated operation, the quay crane 100 may transfer the container 108 directly onto a receiving vehicle 120.

After receiving a container 108, the receiving vehicle 120 may transport the container to a stack yard 135 where a straddle carrier 130, a top pick container handler 140, a reach stacker, or other container moving apparatus moves the container from the truck chassis to a stack of containers 135 or to another vehicle, such as a train or another truck. Where the container is moved to a stack yard 135, the container may be temporarily stored in the stack yard 135 and, at some point, moved by the straddle carrier 130 and/or some other container moving apparatus to a vehicle that will transport the container to a location outside of the terminal. In some modern terminals, some or all of this process is automated by, for example, using driverless UTRs that shuttle containers between the quay crane 100 and the stack yard 135.

The above-described process may be repeated continuously throughout the day and a typical terminal may process thousands of containers or other cargo each day. In addition to the normal inbound and outbound traffic, the cargo will occasionally have to be moved about the terminal for various reasons. Trucks, cranes, or other container moving equipment may be responsible for moving containers about the terminal. The terminal must not only efficiently move all of this cargo into, out of, and around the terminal, but the terminal must also monitor the movement of the cargo, the transporters, and the cargo moving equipment. Thus, there is a need for a more efficient and/or accurate system for tracking the cargo and equipment in a terminal and for managing and monitoring the activity in the terminal.

In most instances, the identification and recordation of shipping containers and/or the vehicles that transport the shipping containers is done manually, using spotters who write down or enter identification information into a logbook or a computer terminal. As is the case with any process that involves manual input of data, a system that employs manual identification and recordation of shipping containers and the vehicles or devices that transport the containers can be plagued with errors. Additionally, the manual systems do not provide for real-time reporting of the movement of cargo and vehicles in the terminal, nor do they provide for automated direct entry into the terminal's computerized operating system of a record of each time a piece of cargo is transferred to or from a cargo moving apparatus within the terminal.

To accurately monitor the movement of cargo and other equipment around the terminal, it would be advantageous to know which cargo is loaded onto exactly which vehicle, and to have this information be as accurate and timely as possible. It would also be advantageous to have such information reported to the terminal's computerized operating system automatically and in real-time or near-real time.

BRIEF SUMMARY OF EMBODIMENTS OF THE INVENTION

Systems, methods, apparatus, and computer program products are provided for monitoring the transfer of cargo, such as a shipping container, to and from a transporter, such as a truck. Identification codes are provided on the cargo and the transporter to aid in the identification of the cargo and the transporter. One or more identification code receiving devices, such as a camera, may be associated with a cargo moving apparatus, such as a crane, and configured to automatically capture the transporter identification code and the cargo identification code as the cargo is being transferred to or from the transporter. The transporter identification code and the cargo identification code can be associated with each other along with other information about the transfer in order to monitor the transfer. In this regard, identification information may be communicated to a shipping terminal's operating system to provide real-time or near real-time information about one or more transfers occurring within a shipping terminal.

More particularly, embodiments of the present invention provide a system for identifying a transporter and cargo during a loading or unloading operation. The system may include a transporter identification component configured to receive a transporter identification code from the transporter during the loading or unloading operation and determine transporter identification information therefrom. The transporter identification component may be configured to capture a machine-readable representation of the transporter identification code. The system may further include a cargo identification component configured to receive a cargo identification code from the cargo during the loading or unloading operation and determine cargo identification information therefrom. The cargo identification component may be configured to capture a machine-readable representation of the cargo identification code.

In one embodiment, one or more of the system's identification components is configured to capture an optical representation of an identification code and determine identification information therefrom. The system may include a processing component configured to associate the transporter identification information with the cargo identification information. The system may also include a communication interface configured to communicate the transporter identification information and the cargo identification information to a Terminal Operating System (TOS).

In one embodiment, the transporter identification component includes a transporter identification code receiving device for receiving the transporter identification code from the transporter, and the cargo identification component includes a cargo identification code receiving device for receiving the cargo identification code from the cargo. In such an embodiment, the transporter identification code receiving device and the cargo identification code receiving device may be coupled to a cargo moving apparatus configured to load or unload the cargo to or from the transporter.

The transporter identification component may include a transporter identification code receiving device for capturing the machine-readable representation of the transporter identification code from the transporter, and a transporter identification code decoding device configured to decode the machine-readable representation of the transporter identification code. For example, the transporter identification code receiving device may include a transporter identification code imaging device for optically capturing an optical representation of the transporter identification code from the transporter. In this regard, the transporter identification code may include a barcode, such as a one or two-dimensional barcode, and the transporter identification code imaging device may be configured to optically capture an optical representation of the barcode. The decoding device may be configured to decode the optical representation of the barcode.

In one embodiment, the transporter identification component may also include a second transporter identification code receiving device for receiving a second transporter identification code from the transporter. In such an embodiment, the transporter identification component may be configured to compare information received from the second identification code to transporter identification information received by capturing the machine-readable representation of the transporter identification code from the transporter.

In one embodiment, the transporter identification code includes an alphanumeric code and the transporter identification component is configured to capture an optical representation of the alphanumeric code. In such an embodiment, the system may include an Optical Character Recognition (OCR) system configured to receive the optical representation of the alphanumeric code and determine transporter identification information therefrom. In another embodiment, the transporter identification component may include a radio frequency receiver for receiving a radio frequency signal from a radio frequency identification tag associated with the transporter.

Similar to the transporter identification component, the cargo identification component may include a cargo identification code receiving device for capturing the machine-readable representation of the cargo identification code from the cargo. The cargo identification component may further include a cargo identification code decoding device configured to decode the machine-readable representation of the cargo identification code. For example, in one embodiment, where the cargo identification code includes a barcode, the cargo identification code receiving device is configured to capture an optical representation of the barcode, and the decoding device is configured to decode the optical representation of the barcode. In another embodiment, where the cargo identification code includes a radio frequency signal from a radio frequency identification tag associated with the cargo, the cargo identification code receiving device comprises a radio frequency receiver for receiving the radio frequency signal and the decoding device is configured to decode the radio frequency signal. In yet another embodiment, where the cargo identification code comprises an alphanumeric code, the system may include an Optical Character Recognition (OCR) system configured to receive the optical representation of the alphanumeric code and determine cargo identification information therefrom.

The cargo identification component may also include a second cargo identification code receiving device for receiving a second cargo identification code from the cargo. In such an embodiment, the cargo identification component may be configured to compare information received from the second identification code to cargo identification information received by capturing the machine-readable representation of the cargo identification code from the cargo.

The system may also include a transport detector configured to detect when the transporter is in a loading or unloading zone. The transporter identification component may then be configured to capture a machine-readable representation of the transporter identification code in response to the transport detector detecting the transporter in the loading or unloading zone. Similarly, the system may include a cargo detector configured to detect when the cargo is in a loading or unloading zone. The cargo identification component may then be configured to capture a machine-readable representation of the cargo identification code in response to the cargo detector detecting the cargo in the loading or unloading zone.

The system may also include a cargo moving apparatus control system for controlling movement of a cargo moving apparatus, such as a crane, during the loading or unloading operation. A cargo detection system may then receive, from the cargo moving apparatus control system, information about the movement of the cargo moving apparatus during the loading or unloading operation. For example, such information may include hoist and trolley data describing the movement of the crane. The cargo detection system may then be configured to determine the cargo's location from the information about the movement of the cargo moving apparatus, and the cargo identification component may be configured to capture a machine-readable representation of the cargo identification code based on the location of the cargo determined by the cargo detection system.

Embodiments of the present invention further provide for a method of managing the transfer of cargo to or from a transporter. For example, the method may include: (1) providing a transporter identification code capturing device; (2) providing a cargo identification code capturing device; (3) capturing a transporter identification code from the transporter using the transporter identification code capturing device during the transfer of the cargo to or from the transporter; (4) capturing a cargo identification code from the cargo using the cargo identification code capturing device during the transfer of the cargo to or from the transporter; (5) determining transporter identification information from the transporter identification code; and (6) determining cargo identification information from the cargo identification code.

In one embodiment, where the transporter identification code capturing device includes an identification code imaging device, capturing a transporter identification code may include using the identification code imaging device to optically capture an optical representation of the transporter identification code.

The method may further include associating the transporter identification information with the cargo identification information, and/or communicating the transporter identification information and the cargo identification information to a Terminal Operating System (TOS).

In one embodiment, capturing the transporter identification code comprises scanning a barcode associated with the transporter. In another embodiment, capturing the transporter identification code comprises capturing an image of an alphanumeric code associated with the transporter. In such an embodiment, capturing the transporter identification code may involve using an Optical Character Recognition (OCR) system to determine transporter identification information from the captured image of the alphanumeric code.

In one embodiment, capturing the cargo identification code comprises optically scanning a barcode associated with the cargo. In another embodiment, capturing the cargo identification code comprises capturing an image of an alphanumeric code associated with the cargo. In such an embodiment, capturing the cargo identification code may involve using an Optical Character Recognition (OCR) system to determine cargo identification information from the captured image of the alphanumeric code. In yet another embodiment, capturing the cargo identification code involves capturing a radio frequency signal from a radio frequency identification tag associated with the cargo.

The method may further involve illuminating at least one of the transporter identification code located on the transporter or the cargo identification code located on the cargo with a light source during the transfer of the cargo to or from the transporter. The illumination may be performed based on detection of the ambient light proximate the transporter identification code on the transporter or the cargo identification code on the cargo. In another embodiment, the illumination is performed based on detection of the brightness of the transporter identification code on the transporter or the cargo identification code on the cargo.

The method may further involve receiving contextual logistic information about the cargo loading or unloading operation, and associating the contextual logistic information with the transporter identification information and the cargo identification information. For example, contextual information may include information related to at least one of the time of the loading or unloading operation, identification of the cargo moving apparatus, or identification of a lane in which the transporter is located.

Embodiments of the present invention may further provide an apparatus for transferring cargo to or from a transporter. For example, the apparatus may be embodied as a containerized cargo moving apparatus selected from the group consisting of a gantry crane, a quay crane, a rubber tired gantry crane, a top-pick container handler, a side-pick container handler, a straddle carrier, a shuttle carrier, a reach stacker, and a forklift vehicle. The apparatus may include a transporter identification device and a cargo identification device. The transporter identification device may be configured to receive a transporter identification code from the transporter, and the transporter identification device may include a transporter identification code receiving device configured to capture a machine-readable representation of the transporter identification code. Likewise, the cargo identification device may be configured to receive a cargo identification code from the cargo, and the cargo identification device may include a cargo identification code receiving device configured to capture a machine-readable representation of the cargo identification code. In one embodiment, the transporter identification device and the cargo identification device are configured to receive the transporter identification code and the cargo identification code during an operation of loading or unloading the cargo to or from the transporter.

One or more of the identification code receiving devices may be configured to capture an optical representation of an identification code. The apparatus may have a processor coupled to the transporter identification device and the cargo identification device and configured to determine transporter identification information from the transporter identification code and to determine cargo identification information from the cargo identification code.

The apparatus may include a crane for loading or unloading containerized cargo to or from the transporter. In one embodiment, the crane includes a support structure and the transporter identification code receiving device and the cargo identification code receiving device are coupled to the support structure. In another embodiment, the crane has an operator booth and the transporter identification code receiving device is located proximate the operator booth. In still another embodiment, the crane has a headblock and the transporter identification code receiving device is coupled to the headblock.

The apparatus may have a communication interface operatively coupled to the transporter identification code receiving device and the cargo identification code receiving device and configured to communicate information related to the received transporter information code and the received cargo identification code to a Terminal Operating System (TOS). In one embodiment, the apparatus has an imaging device configured to be used as both the transporter identification code receiving device and the cargo identification code receiving device.

Embodiments of the present invention provide a computer program product for identifying a transporter and cargo during a cargo loading or unloading operation in which a cargo moving apparatus performs the loading or unloading of the cargo, the transporter having a transporter identification code and the cargo having a cargo identification code. The computer program product may include at least one computer-readable storage medium having computer-readable program code logic stored therein. In this regard, the computer-readable program code logic may include: a first code logic configured for receiving a machine-readable representation of the transporter identification code; a second code logic configured for determining transporter identification information from the machine-readable representation of the transporter identification code; a third code logic configured for storing the transporter identification information in a memory; a fourth code logic configured for receiving a machine-readable representation of the cargo identification code; a fifth code logic configured for determining cargo identification information from the machine-readable representation of the transporter identification code; and a sixth code logic configured for storing the cargo identification information in a memory.

The first code logic may be configured for receiving an optical representation of the transporter identification code, and the second code logic may be configured for determining transporter identification information from the optical representation of the transporter identification code.

The computer program product may further include a code logic configured for associating the transporter identification information with the cargo identification information. The computer program product may also include code logic configured for communicating the transporter identification information and the cargo identification information to a Terminal Operating System (TOS).

The computer program product may further include code logic configured for activating a transporter identification code imaging device associated with the cargo moving apparatus to optically capture the optical representation of the transporter identification code, and code logic configured for activating a cargo identification code receiving device associated with the cargo moving apparatus to capture the machine-readable representation of the cargo identification code. In one embodiment, the transporter identification code is physically associated with the transporter and the cargo identification code is physically associated with the cargo.

The computer program product may further include code logic configured for activating a light source to illuminate the transporter identification code located on the transporter and/or the cargo identification code located on the cargo during the transfer of the cargo to or from the transporter. Such code logic may be configured for activating or adjusting the light source based on detection of the ambient light proximate the transporter identification code on the transporter or the cargo identification code on the cargo. Alternatively, such code logic may be configured for activating or adjusting the light source based on detection of the brightness of the transporter identification code on the transporter or the cargo identification code on the cargo.

In one embodiment, the computer program product includes code logic configured for decoding a barcode or a two-dimensional barcode in the representation of the transporter identification code or the cargo identification code. In another embodiment, the computer program product includes code logic configured for recognizing and decoding alphanumeric characters in the representation of the transporter identification code or the cargo identification code.

The computer program product may include code logic configured for receiving contextual logistic information about the cargo loading or unloading operation, and code logic configured for associating the contextual logistic information with the transporter identification information and the cargo identification information. For example, the contextual information may include information related to at least one of the time of the loading or unloading operation, identification of the cargo moving apparatus, or identification of a lane in which the transporter is located.

Embodiments of the present invention may also provide for a cargo transfer system. The cargo transfer system may include a cargo moving apparatus structured to move cargo between a first location and a second location, the second location being on a transporter. The cargo transfer system may further include a transporter identification device configured to determine transporter identification information from a transporter identification code associated with the transporter. In this regard, the transporter identification device may be configured to capture the transporter identification code as the cargo moving apparatus is loading or unloading the cargo to or from the transporter. The cargo transfer system may further include a cargo identification device configured to determine cargo identification information from a cargo identification code associated with the cargo. In this regard, the cargo identification device may be configured to capture the cargo identification code associated with the cargo as the loading apparatus is loading or unloading the cargo to or from the transporter.

The transporter identification device of the cargo transfer system may include an imaging device configured to capture an optical representation of the transporter identification code. The cargo transfer system may include a processing device configured to associate the transporter identification information with the cargo identification information. The cargo transfer system may also include a Terminal Operating System (TOS) configured to receive the transporter identification information and the cargo identification information to track or manage the loading or unloading of cargo, and a communication network configured to communicate information among the transporter identification device, the cargo identification device, and the TOS.

In one embodiment, where the transporter identification code comprises a barcode or a two-dimensional barcode, the transporter identification device may include a barcode reader configured to determine transporter identification information from the barcode or the two-dimensional barcode. In another embodiment, where the transporter identification code comprises alphanumeric characters, the transporter identification device may include an imaging device for capturing an image of the alphanumeric characters, and an Optical Character Recognition (OCR) system for recognizing the alphanumeric characters in the captured image.

In one embodiment of the cargo transfer system the cargo is containerized cargo. In this regard, the cargo moving apparatus may be a container moving apparatus selected from the group consisting of a gantry crane, a quay crane, a rubber tired gantry crane, a top-pick container handler, a side-pick container handler, a straddle carrier, a shuttle carrier, a reach stacker, and a forklift vehicle.

In one embodiment of the cargo transfer system the transporter identification code is physically associated with the transporter and the cargo identification code is physically associated with the cargo. In one embodiment, the transporter identification device and the cargo identification device are associated with the cargo moving apparatus.

Embodiments of the present invention provide a system for monitoring movement of cargo. The system may include a crane configured for loading or unloading cargo to or from a truck. The system may further include one or more cameras configured for capturing, while the crane is loading or unloading cargo to or from the truck, one or more images of a cargo identification code associated with the cargo and a truck identification code associated with the truck.

Embodiments of the present invention provide a system for managing operation of a terminal. The system may include a crane configured for loading or unloading cargo to or from a truck. The system may further include a terminal operating system (TOS) configured to receive truck identification information and cargo identification information from a truck identification code and a cargo identification code captured from the truck and the cargo, respectively, while the crane is loading or unloading the cargo to or from the truck.

BRIEF DESCRIPTION OF THE SEVERAL VIEWS OF THE DRAWING(S)

Figure 2:
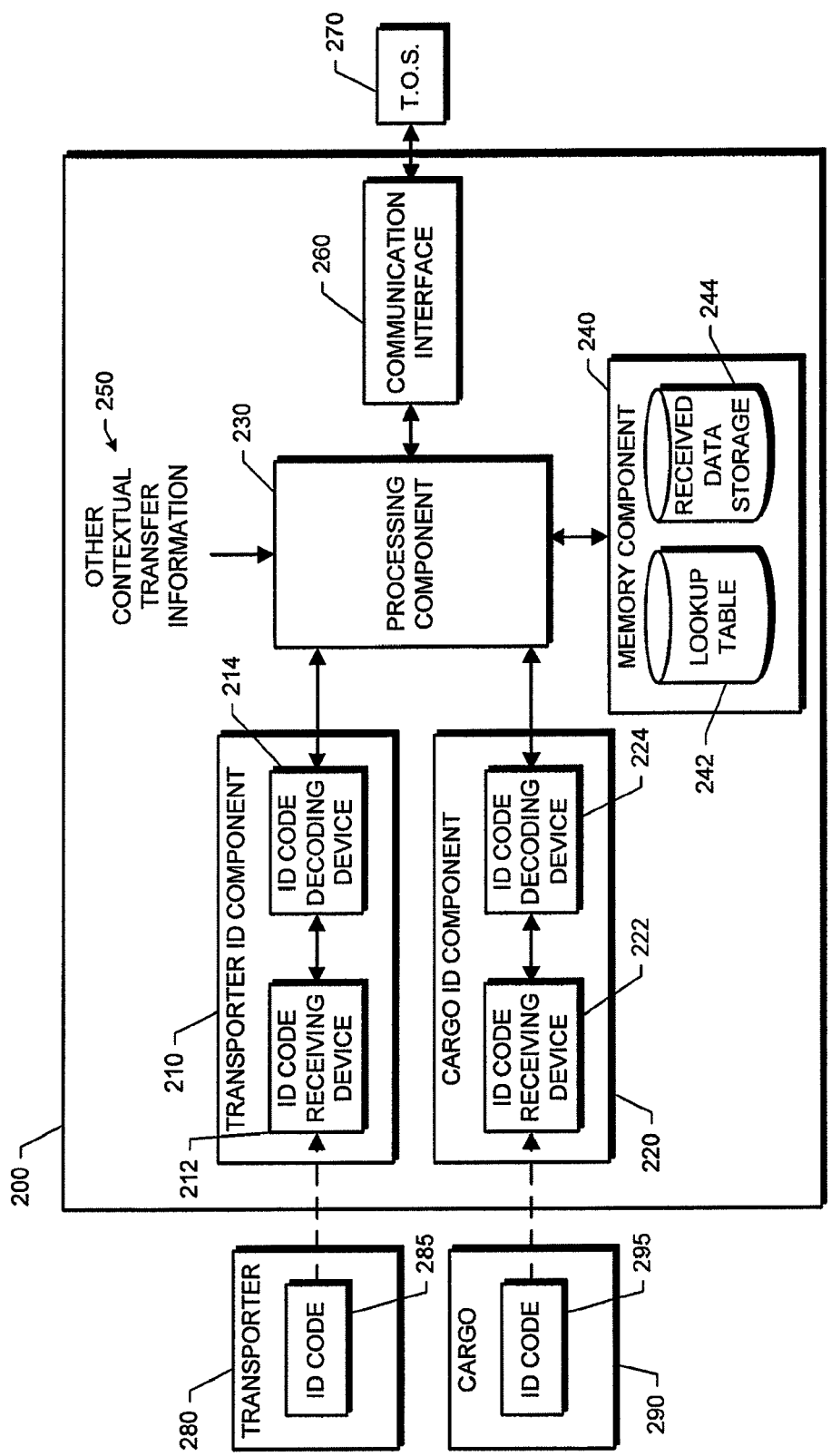
Figure 3:
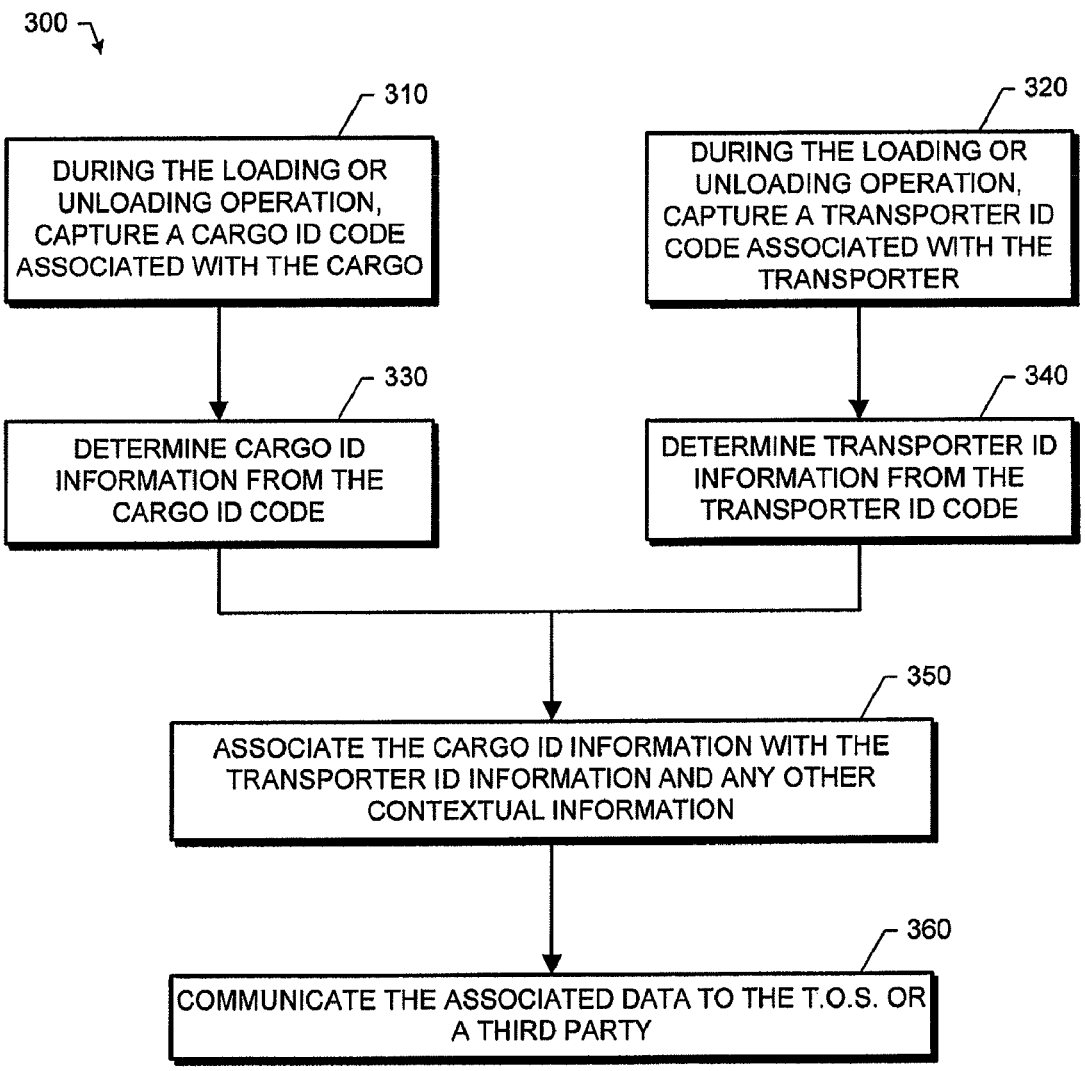
Figure 4:
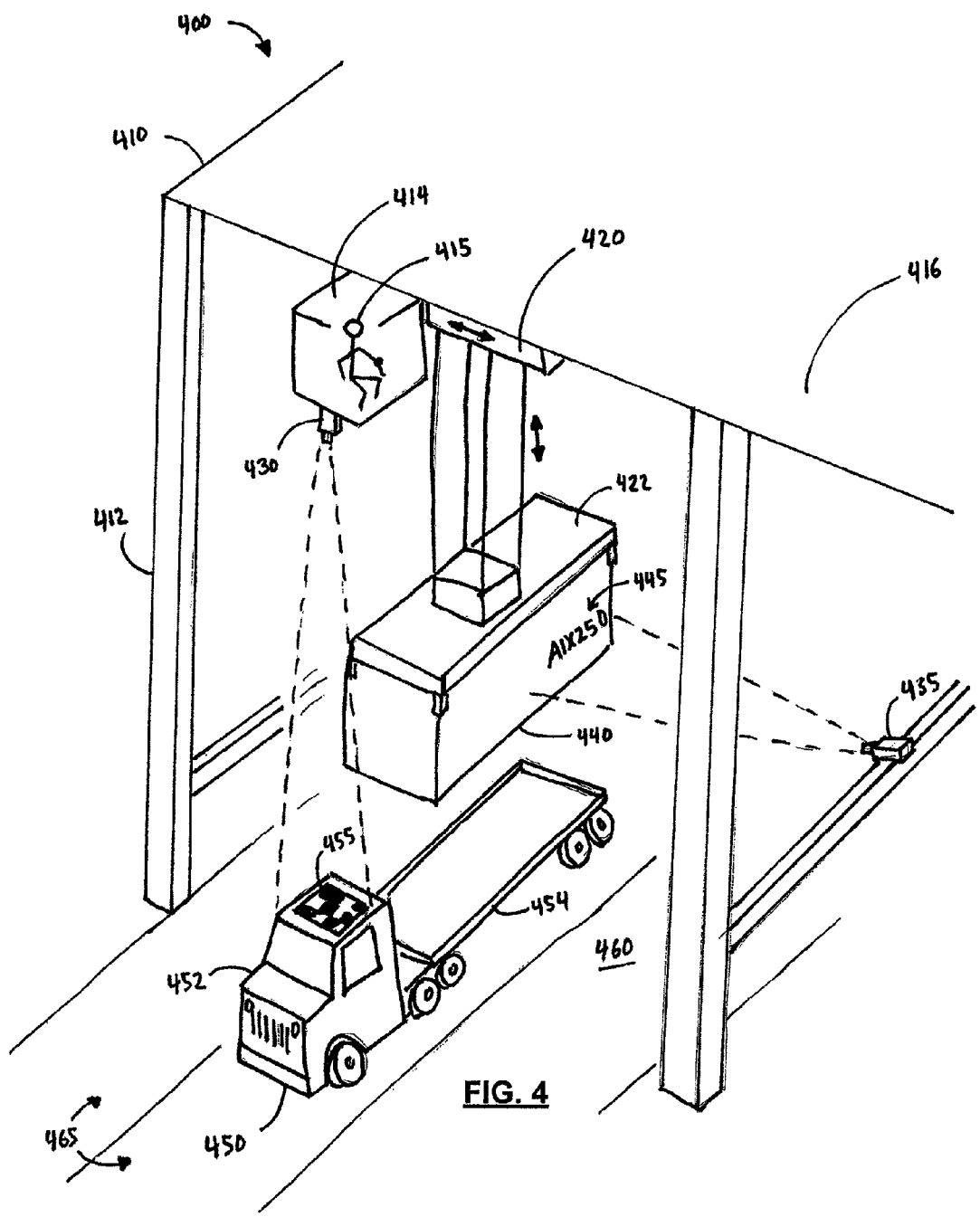
Figure 5:
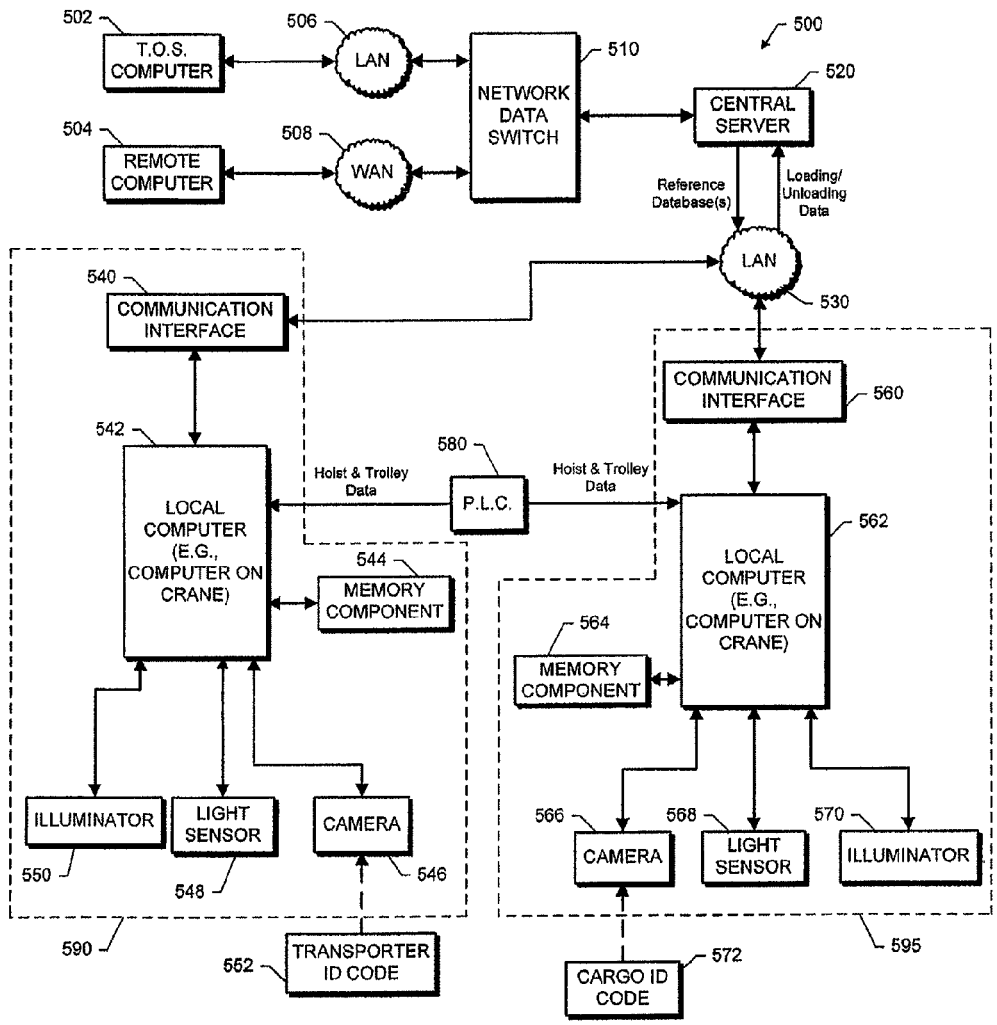
Figure 6:
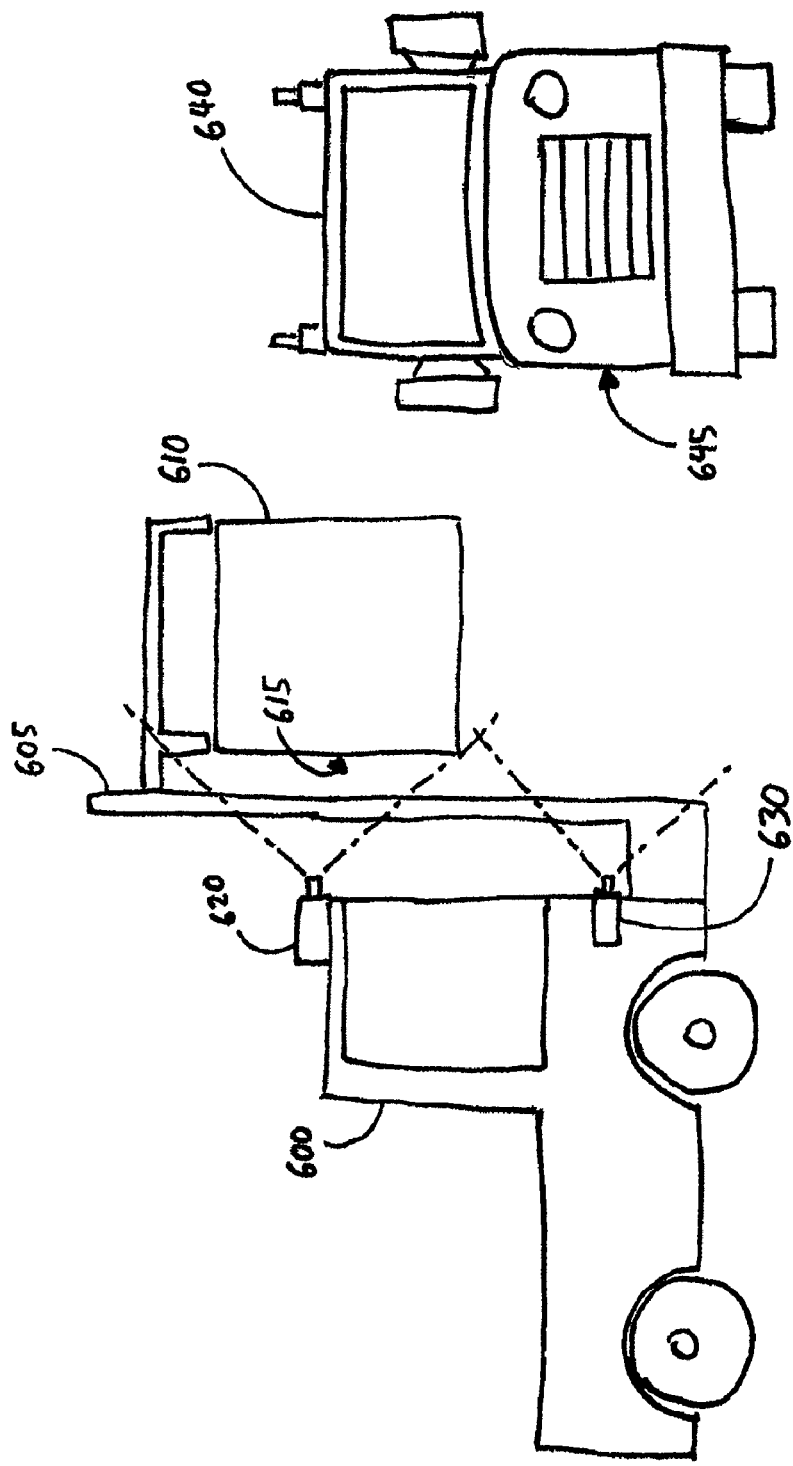

Having thus described the invention in general terms, reference will now be made to the accompanying drawings, which are not necessarily drawn to scale, and wherein:

FIG. 1 provides a perspective view of at least a portion of a typical container terminal and illustrates at least some of the vehicles and devices that may exist at a typical container terminal;

FIG. 2 provides a high level block diagram that illustrates a system for identifying a transporter and cargo during a loading or unloading operation, in accordance with an embodiment of the present invention;

FIG. 3 provides a high level flow diagram that illustrates a method for monitoring the transfer of cargo to or from a transporter, in accordance with an embodiment of the present invention;

FIG. 4 provides a prospective view of at least a portion of a cargo moving apparatus for transferring cargo to or from a transporter and an associated system for receiving transporter and cargo identification codes from the transporter and the cargo, in accordance with an embodiment of the present invention;

FIG. 5 provides a more detailed block diagram that illustrates a system for identifying a transporter and cargo during a loading or unloading operation, in accordance with an embodiment of the present invention; and FIG. 6 provides a perspective view of another type of cargo moving apparatus for loading or unloading cargo to or from a vehicle and for receiving transporter and cargo identification codes from the transporter and the cargo, in accordance with an embodiment of the present invention.

DETAILED DESCRIPTION OF EMBODIMENTS THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are described below with reference to block diagrams and flowchart illustrations of methods, apparatus (i.e., systems), and computer program products according to embodiments of the invention. It will be understood that each block of the block diagrams and flowchart illustrations, and combinations of blocks in the block diagrams and flowchart illustrations, respectively, can be implemented by computer-readable program code logic. The computer-readable program code logic may be loaded onto a general purpose computer, special purpose computer, or other programmable data processing apparatus to produce a machine, such that the code logic that executes on the computer or other programmable data processing apparatus create means for implementing the functions specified in the system or flowchart blocks.

Furthermore, the computer-readable program code logic may be stored in a computer-readable memory that can direct a computer or other programmable data processing apparatus to function in a particular manner, such that the code logic stored in the computer-readable memory produces an article of manufacture including code logic means which implement the function specified in the flowchart block or blocks. The computer-readable program code logic may also be loaded onto a computer or other programmable data processing apparatus to cause a series of operational steps to be performed on the computer or other programmable apparatus to produce a computer implemented process such that the code logic that executes on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program code logic means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer-readable program code logic.

Embodiments of the present invention provide systems, methods, apparatus, and computer program products for use in monitoring the transfer of cargo to or from a transporter. As used herein, the term "transporter" refers to any vehicle or other device used to transport cargo from one location to another location. For example, the transporter may include a truck-tractor or a "utility tractor rig" (UTR), a truck chassis, a bomb-cart, an automated guided vehicle (AVG), a railcar or train engine, a ship, an aircraft, or the like. As used herein, the term "cargo" generally refers to any type of cargo and may include, for example, containerized, bulk, and/or break-bulk cargo. The cargo may be, for example, a standard 20-ft (6.1 m), 40-ft (12.2 m), 45-ft (13.7 m), 48-ft (14.6 m), or 53-ft (16.2 m) shipping container.

In general, embodiments of the present invention monitor the transfer of cargo to and from a transporter by identifying the transporter and the cargo during the loading or unloading operation. As used herein, the "loading operation" refers to the operation of a cargo moving apparatus physically transferring an item of cargo from a first location, which may or may not be on a vehicle, to a second location on the transporter. In this regard, the loading operation begins at the earlier of: (1) the moment in time when the transporter is in the position where it will receive the cargo, and (2) the moment in time when the cargo moving apparatus engages the cargo at the first location. The loading operation ends when: (1) the transporter has received the cargo from the cargo moving apparatus, and (2) when the transporter (with the cargo) moves away from the cargo moving apparatus or when the cargo moving apparatus (without the cargo) moves away from the transporter.

As used herein, the "unloading operation" refers to the operation of a cargo moving apparatus transferring an item of cargo from a first location on the transporter to a second location not on the transporter, which may or may not be on another transporter. In this regard, the unloading operation begins at the moment in time when the transporter is in the position where the cargo moving apparatus will engage the cargo on the transporter. The unloading operation ends at the later of: (1) the moment in time when the transporter (without the cargo) begins to move away from the cargo moving apparatus, and (2) the moment in time when the cargo moving apparatus disengages the cargo at the second location.

In one embodiment, the system is configured to monitor the transfer of an item of cargo to and/or from a transporter by identifying the transporter and the item of cargo during the time that the cargo moving apparatus is in control of the item of cargo.

As used herein, a "cargo moving apparatus" refers to a vehicle or other device configured for moving cargo from one location to another location. In general, the cargo moving apparatus includes a crane or other lifting apparatus or means configured for lifting cargo onto and off of a transporter. For example, a cargo moving apparatus may be a gantry crane, a quay crane, a rubber-tired gantry crane, a top-pick container handler, a side-pick container handler, a straddle carrier, a shuttle carrier, a reach stacker, a forklift vehicle, or like means configured for moving cargo onto or off of a transporter.

FIG. 2 provides a high level block diagram that illustrates a cargo transfer monitoring system 200 for identifying a transporter and cargo during a loading or unloading operation, in accordance with an embodiment of the present invention. In the illustrated embodiment, the cargo transfer monitoring system 200 includes a transporter identification component 210, a cargo identification component 220, and a processing component 230 operatively coupled to the transporter identification component 210 and the cargo identification component 220. The cargo transfer monitoring system 200 may also include a memory component 240 and a communication interface 260, both operatively connected to the processing component 230.

As illustrated in FIG. 2, a transporter 280 is provided and either has cargo 290 for unloading or is configured to receive cargo 290 from a crane or other cargo moving apparatus. The transporter 280 has a transporter identification code 285 associated with it and the cargo 290 has a cargo identification code 295 associated with it. The transporter identification code 285 and the cargo identification code 295 may include, for example, one or more alphanumeric codes, barcodes, radio frequency identification tag (RFID) signals, and/or any other type of code known in the art. As used herein, an "alphanumeric code" refers to any code that uses at least one numeric character or at least one alphabetic character. In other words, the alphanumeric code may include only numerals, only alphabetic characters, a combination of numerals and alphabetic characters, or at least one numeral or alphabetic character with one or more other characters or symbols. Other types of codes may include other visual characters or symbols that are not necessarily alphanumeric. As used herein, the term "barcode" refers to one-dimensional barcodes, two-dimensional barcodes, and barcodes of any other dimension.

In a preferred embodiment, the transporter identification code 285 and the cargo identification code 295 are physically associated with the transporter 280 and the cargo 290, respectively. For example, in one embodiment a visual representation of an identification code, such as an alphanumeric code, is painted on an exterior surface of the cargo or the transporter. In other embodiments, the identification code may be on a decal or a magnet that can attach to a surface of the cargo or the transporter. In other embodiments, the identification code is included in an RFID tag or other device that is physically attached to or contained in a portion of the cargo or transporter and is configured to transmit radio frequency signals or other wireless signals containing the identification code and/or other information about the cargo or transporter.

In some embodiments, multiple identification codes may be associated with a particular transporter or item of cargo. In such embodiments, the identification codes may be identical to each other or may be different relative to each other. Where multiple identification codes are provided and where the multiple identification codes are identical, the codes may be placed on different areas of the cargo or the transporter or one identification code may be used to confirm the information obtained from another identification code. Where multiple identification codes are provided and where the multiple identification codes are different, each identification code may communicate different information to a decoding device or one identification code may be used to confirm the information obtained from another identification code. For example, a barcode located on the exterior of a transporter may be used to identify the transporter, while radio frequency signals emanating from an RFID tag or other device attached to or within the transporter may communicate other information about the transporter, such as the transporter's loading capacity, or about the internal cargo contents.

In some embodiments, the same identification code may be communicated using different communication systems. For example, an alphanumeric identification code may be displayed visually on an exterior surface of the transporter. The same alphanumeric code, however, may also be included in binary form in the memory of an RFID tag associated with the transporter.

In general, the cargo transfer monitoring system 200 is configured to receive the transporter identification code 285 from the transporter 280 using the transporter identification component 210. In this regard, the transporter identification component 210 may include a transporter identification code receiving device 212 and a transporter identification code decoding device 214. The transporter identification code receiving device 212 is configured to receive the identification code 285, or some representation of the identification code, from the transporter 280. The transporter identification code decoding device 214 is configured to receive the representation of the identification code captured by the identification code receiving device 212 and convert it into a form that the processing component 230 can utilize.

Similarly, the cargo transfer monitoring system 200 is generally configured to receive the cargo identification code 295 from the cargo 290 using the cargo identification component 220. In this regard, the cargo identification component 220 may include a cargo identification code receiving device 222 and a cargo identification code decoding device 224. The cargo identification code receiving device 222 is configured to receive the identification code 295, or some representation of the identification code, from the cargo 290. The cargo identification code decoding device 224 is configured to receive the representation of the identification code captured by the identification code receiving device 222 and convert it into a form that the processing component 230 can utilize.

Although displayed as logically different components in the system 200, the cargo and transporter identification components may share one or more of the same devices. In this regard, the same receiving device and/or the same decoding device may be used for both the transporter and cargo identification components. For example, in one embodiment where the transporter and the cargo each have an identification code in the form of a barcode, the transporter identification component 210 and the cargo identification component 220 may share the same one or more infrared scanners or other barcode readers to read both the transporter identification code 285 and the cargo identification code 295.

In this regard, in one embodiment, an identification code receiving device is an optical device configured to receive an optical representation of the identification code from the transporter and/or the cargo. The optical device may include one or more light sensors or other photosensitive device or material. The optical device may include one or more lenses in order to receive any light transmitted by or reflected from an optical identification code and focus the light onto the light sensors or other photosensitive device or material. For example, an identification code receiving device may include a camera. The camera may be an analog camera or a digital camera and the camera may be a camera or a still camera. In such an embodiment, the camera may be configured to capture an image of an alphanumeric code, a barcode, a two-dimensional barcode, or other visual identification code associated with the cargo or the transporter. In some embodiments, the light captured by an optical receiving device is transmitted by an identification code device of the cargo or the transporter. In most embodiments, however, the light captured by an optical receiving device is ambient light or light provided by the receiving device or an illumination device of the system 200 that is reflected by the identification code.

In another exemplary embodiment, the identification code receiving device may include a barcode scanner. The barcode scanner may be configured to receive light reflected off of a barcode. As such, the system 200 may include a light source, such as a visible laser emitting diode or an infrared laser emitting diode, that is configured to at least momentarily illuminate the barcode such that the receiving device may receive the light reflected off of the identification code, thereby receiving an optical representation of the identification code.

Where an identification code receiving device includes an optical receiving device, such as a camera or a scanner, the identification code decoding device may include an analog to digital converter for converting the received analog signal to a digital signal that can be utilized by the processing component 230. The identification code decoding device may also be configured to conduct further processing of the received representation of the identification code prior to communicating the identification code information to the processing component. For example, where a transporter identification code 285 includes an alphanumeric code painted on the side of the transporter 280, the transporter identification code receiving device 212 may include a camera that captures an image of the identification code. The transporter identification code decoding device 214 may comprise an Optical Character Recognition (OCR) system and/or application that it uses to determine the identification code from the captured image of the identification code. The transporter identification code decoding device 214 may then communicate the determined identification code to the processing component for further processing. Similarly, where the identification includes a barcode, the decoding device may be configured to interpret the image or light captured by the receiving device and convert it into digital data, such as a binary number, that the processing component 230 is able to understand and process.

In one embodiment, an identification code receiving device may include an antenna for receiving a radio frequency signal or other wireless signal from a RFID tag or other device associated with the cargo or the transporter. For example, the cargo 290 may comprise a RFID tag that contains the cargo identification code 295 and/or other information related to the cargo 290. In such an embodiment, the cargo identification code receiving device 222 may comprise an antenna configured to receive radio frequency signals from the RFID tag and the decoding device 224 may include a receiver and an analog-to-digital converter for converting the radio signals into digital form. Where the RFID tag associated with the cargo 290 or the transporter 280 is a passive RFID tag, the appropriate identification code receiving device may include a radio frequency modulator and be further configured to use the antenna and the modulator to transmit radio frequency signals to the RFID tag and, thereby, power up the passive tag and receive information therefrom. In other embodiments, the identification code receiving device may also be configured to write information to an RFID tag associated with a transporter or cargo. For example, transporter identification information could be written to an RFID tag associated with the cargo and/or cargo identification information could be written to an RFID tag associated with the transporter.

Although several exemplary identification codes and identification code receiving devices are described herein, in other embodiments, other types of identification codes and identification code receiving devices may be used as will be apparent to one of ordinary skill in the art in view of this disclosure. In one embodiment, an identification code receiving device may be any device configured to receive a portion of the electromagnetic spectrum emitted or reflected by an identification code or identification code device associated with the transporter or the cargo, including without limitation microwave and ultraviolet waves.

Once the transporter identification component 210 and the cargo identification component 220 capture a transporter identification code 285 and a cargo identification code 295, the codes and/or other information related to the codes, the cargo, and/or the transporter may be communicated to the processing component 230. The processing component may then store the identification codes and/or other information that it receives in a temporary or a permanent data store 244 of the memory component 240.

In one embodiment, the processing component 230 is configured to use the transporter and cargo identification codes to determine other information about the transporter and the cargo, respectively. In this regard, the memory component 240 may include one or more predefined lookup tables 242 or other data structures stored therein that allow the processing component 230 to determine other information about the transporter and/or the cargo given the transporter and/or cargo identification codes. For example, comparing the cargo identification code 295 to records in a lookup table 242 may provide such information about the cargo as the cargo's: destination address, origination address, type, owner, weight, size, target delivery date, and the like. Comparing the transporter identification code 285 to records in a lookup table 242 may provide such information about the transporter as its: type, maximum loading weight, size, driver, vehicle identification number, destination, division, identification number used in a third party system, and the like.

In other embodiments, the processor may be configured to determine other information about the cargo and/or the transporter by recognizing certain characters or symbols in the identification codes or by manipulating the identification codes. For example, all transporter identification codes beginning with an "AB" may indicate that the transporter is an automated bombcart.

In still other embodiments, the processing component may use the transporter and/or cargo identification codes only as unique identifiers for the transporter and cargo. In such an embodiment, the processing component may associate the cargo identification code with the transporter identification code and possibly other contextual information, such as the time of the transfer, and then communicate the codes and any contextual information to the terminal operating system (TOS) 270 or remote third-party systems using the communication interface 260. In one embodiment, the memory component 240 includes a list of known identification codes such that, if the identification component provides the processing component with an identification code that does not match a known identification code, the system can attempt to reread the code, re-decode the code, provide an error message to the operator, alert a security system, or otherwise take an appropriate action.

In one embodiment, the processing component 230 may be configured to associate transporter identification information related to the transporter 280 with cargo identification information related to the cargo 290 that is being loaded onto or unloaded from the transporter 280. The processing component 230 may be configured to associate the cargo with the transporter by associating the received transporter and cargo identification codes and storing them in the memory component 240 as being associated with one another. The processing component 230 may also be configured to associate the transporter and the cargo by associating the other transporter information received from the transporter identification code and/or the lookup table with other cargo information received from the cargo identification code and/or the lookup table.

As illustrated in FIG. 2, in some embodiments of the present invention, system 200 is configured to receive and/or store other information, such as contextual information 250 related to the cargo loading or unloading operation. For example, such contextual information 250 may include: an identification code for or other information about the cargo moving apparatus used in the transfer; the time and/or date of the transfer; the lane that the transporter was located in during the transfer (if there are multiple loading or unloading lanes); the ship or other vessel that the cargo is coming from or intended for; a terminal or port identifier; the address of the terminal; the time that it took to complete the transfer; the weather at the time of the transfer; any complication that arose during the transfer; the operator of the transporter and/or the cargo moving apparatus; whether the identification of the cargo and/or the transporter was confirmed using a second identification code associated with the transporter or the cargo; and/or any other information related to the loading or unloading operation.

As described above, the system 200 may further include a communication interface 260 for communicating information about the loading or unloading operation to the TOS 270 or to remote third-party systems. The communication interface 260 may be configured to communicate with the TOS 270 or other system through one or more intermediary networks, such as a Local Area Network (LAN) or a Wide Area Network (WAN). Such networks or other connections between the communication interface of the system 200 and the TOS 270 or other remote system may include wired and/or wireless connections. In one embodiment, the communication interface 260 is further configured to communicate information about the loading or unloading operation to a user interface of the cargo moving apparatus.

The TOS 270 may be configured to use the information gathered from one or more of the cargo transfer monitoring systems 200 to track the movement of containers or other cargo within the terminal and/or to and from the terminal. Since the cargo transfer monitoring system 200 captures identification information for the transporter and cargo during the loading and unloading operation, the movement of cargo can be accurately monitored since it is known exactly which cargo was loaded on which transporter. The cargo transfer monitoring system 200 may be configured to record a timestamp, thereby adding to the accuracy of the overall cargo monitoring system since the TOS 270 or other system can know exactly when a specific cargo was loaded onto a specific transporter. As will be described in greater detail below, in one embodiment of the present invention, the transporter identification code receiving device 212 and/or the cargo identification code receiving device 222 are associated (e.g., physically) with a particular cargo moving apparatus. In such an embodiment, the processor may be configured to associate a cargo moving apparatus identifier with the cargo and transporter identification information, thereby allowing the TOS 270 to know exactly which cargo moving apparatus was used to transfer the cargo.

Therefore, it should be appreciated that embodiments of the present invention can provide an automatic, efficient, and accurate system for monitoring the movement of cargo and other equipment and vehicles within a terminal and/or exiting and entering a terminal. Since, in one embodiment, the identification codes for the transporter and the cargo are captured by the system during the actual transfer of the cargo to or from the transporter, the system can be highly accurate, reliable, and self sufficient. In one embodiment, the cargo transfer monitoring system 200 provides information about the loading or unloading operation to the TOS 270 in real time or in near real time. In this way, the TOS 270 can accurately and efficiently monitor and manage the cargo transfers happening in the terminal as they occur and can, perhaps, recognize errors and security breaches as they occur or very shortly thereafter and also proceed with coordinating further activities for a cargo, transporter, and/or cargo moving apparatus, even while the cargo, transporter, and/or moving apparatus is in a loading or unloading process, or thereafter. For example, the TOS 270 may be configured to display (e.g., on a TOS computer monitor) a computerized representation of the terminal or a portion of the terminal showing the real-time, or near-real-time, movement of cargo from one vehicle or location to another vehicle or location.

FIG. 3 shows a high-level flow chart that illustrates a process 300 of monitoring the transfer of cargo to or from a transporter, in accordance with one embodiment of the present invention. As illustrated by block 310, the process includes capturing a cargo identification code associated with the cargo during the loading or unloading operation. As described above, the cargo identification component 220 of FIG. 2 may be configured to capture the cargo identification code during the loading or unloading operation. In one embodiment, capturing a cargo identification code involves a user, such as a crane operator, communicating with the cargo transfer monitoring system 200 to instruct the system 200 when the cargo identification code receiving device 222 should attempt to capture a code 295 from the cargo 290. For example, during a loading or unloading operation, a crane operator may move the cargo with the crane such that an identification code on the cargo is within the field of view of a cargo identification code receiving device 222. The crane operator may then actuate a user input device of the communication interface 260 to instruct the cargo identification code receiving device 222 to attempt to read the cargo identification code 295 on the cargo 290.

In another embodiment, the cargo transfer monitoring system 200 may be configured to automatically detect when to attempt to capture a cargo identification code 295. For example, the cargo transfer monitoring system 200 may be configured to use a motion sensor, position sensor, or other sensor and/or related data to detect when the cargo 290 or the cargo identification code 295 is within the field of view of the cargo identification code receiving device 222. In still other embodiments, the cargo identification code receiving device 222 may be configured to continuously attempt to capture any cargo identification code 295 that comes into a predefined field of view.

As illustrated by block 330 of FIG. 3, once the cargo identification code is captured during the loading or unloading operation, the process 300 may involve determining cargo identification information from the captured cargo identification code. As described above, cargo identification information may be determined from a cargo identification code decoding device 224 and the processing component 230 of the cargo transfer management system 200. Thus, determining cargo identification information from the cargo identification code may further involve such operations as decoding or converting a captured representation of the identification code, comparing a captured identification code to data in a lookup table or other database, and/or interpreting symbols or codes in the captured identification code. The process of determining cargo identification information from the cargo identification code may occur during the loading or unloading operation, thereby allowing the system or a user of the system to determine any errors in the transfer at the time of the transfer. In other embodiments, cargo identification information may be determined from the captured cargo identification code after the loading or unloading operation. In some embodiments, the only identification information determined from the captured representation of the identification code is the identification code itself, which may, for example, simply be a unique alphanumeric code associated with each piece of cargo that serves no other purpose but to distinguish one piece of cargo from another.

As illustrated by block 320, the process further includes capturing a transporter identification code associated with a transporter during the loading or unloading operation. The transporter identification component 210 of FIG. 2 may be configured to capture the transporter identification code during the loading or unloading operation. In one embodiment, capturing a transporter identification code involves a user, such as a crane operator, communicating with the cargo transfer monitoring system 200 to instruct the system 200 when the transporter identification code receiving device 212 should attempt to capture a code 285 from the transporter 280. For example, during a loading or unloading operation, a crane operator may wait for the transporter to move within the field of view of a transporter identification code receiving device 212 associated with the crane, or the operator may move the crane such that an identification code 285 on the transporter 280 is within the field of view of a transporter identification code receiving device 212. The crane operator may then actuate a user input device of the communication interface 260 to instruct the transporter identification code receiving device 212 to attempt to read the transporter identification code 285 on the transporter 280.

In another embodiment, the cargo transfer monitoring system 200 may be configured to automatically detect when to attempt to capture a transporter identification code 285 by, for example, using a motion sensor, position sensor, or other sensor and/or related data to detect when a transporter 280 or the transporter identification code 285 is within the field of view of a transporter identification code receiving device 212. In still other embodiments, the transporter identification code receiving device 212 may be configured to continuously attempt to capture any transporter identification code 285 that comes into a predefined field of view.

As illustrated by block 340 of FIG. 3, once the transporter identification code is captured during the loading or unloading operation, the process 300 may involve determining transporter identification information from the captured transporter identification code. As described above, transporter identification information may be determined from a transporter identification code decoding device 214 and the processing component 230 of the cargo transfer monitoring system 200. Thus, determining transporter identification information from the transporter identification code may further involve such operations as decoding or converting a captured representation of the identification code, comparing a captured identification code to data in a lookup table or other database, and/or interpreting symbols or codes in the captured identification code. The process of determining transporter identification information from the transporter identification code may occur during the loading or unloading operation, thereby allowing the system or a user of the system to determine any errors in the transfer at the time of the transfer. In other embodiments, transporter identification information may be determined from the captured transporter identification code after the loading or unloading operation. In some embodiments, the only identification information determined from the captured representation of the identification code is the identification code itself, which may, for example, simply be a unique alphanumeric code associated with each transporter that serves no other purpose but to distinguish one transporter from another.

As illustrated in FIG. 3, the cargo identification process and the transporter identification process may occur in parallel to each other. These processes may be conducted concurrently during the loading or unloading operation or at different times during the loading or unloading operation. In other embodiments, such as where the same identification code receiving devices or other devices are used for both the cargo identification and the transporter identification processes, one or more of the illustrated cargo identification operations may occur before or after one or more of the transporter identification operations.

As illustrated by block 350 of FIG. 3, once the cargo and transporter identification codes are captured and identification information is determined from the captured codes, the process 300 further involves associating the cargo identification information captured during a loading or unloading operation with the transporter identification information captured during the same loading or unloading operation in which the cargo identification code was recorded. In this way, the identification information can be recorded or communicated with an indication that the identified cargo was loaded to or unloaded from the identified transporter. As described above, associating the cargo identification information with the transporter identification information may be conducted by the processing component 230 of a cargo monitoring system 200. In one embodiment, the process 300 further includes the association of other information with the cargo and/or transporter identification information, such as contextual information related to the loading or unloading operation or to the context of the loading or unloading operation. Such contextual information may be predefined and stored in a memory component 240 of the cargo transfer monitoring system 200 or such information may be received from other systems or sensors.

As illustrated by block 360, the information about the loading or unloading operation may be communicated to the TOS 270 so that the information may be further processed or otherwise used to monitor and/or manage the movement of cargo into, out of, and within the terminal. Additionally or alternatively, the information may be communicated to remote third-party systems. As described above, the communication of information from the cargo transfer monitoring system 200 to the TOS 270 or to remote third-party systems may be accomplished using the communication interface 260.

FIG. 4 provides a prospective view of at least a portion of a cargo moving apparatus for transferring cargo to or from a transporter and an associated system for receiving transporter and cargo identification codes from the transporter and the cargo, in accordance with an embodiment of the present invention. In this regard, FIG. 4 illustrates an embodiment where the cargo moving apparatus is a quay crane 410. The quay crane 410 includes a support structure 412 for supporting an operator booth 414, a boom 416, and a crane system 420. The crane system includes a headblock 422 that is configured to capture cargo such as a shipping container 440. The crane system 420 typically includes a track that extends along the boom 416 that allows to the crane system 420 to move the headblock 422 laterally along the boom 416. This lateral motion of the headblock 422 is often referred to as "trolley." The crane system 420 also typically includes a system of cables that allows the crane system to raise and lower the headblock 422. This motion of the headblock 422 is often referred to a "hoist." The hoist and trolley motion of the headblock 422 is usually controlled by an operator 415 sitting in the operator booth 414.

A loading/unloading area 460 is located below at least a portion of the boom 416. The loading/unloading area may have one or more lanes 465 in which one or more transporters can be located during a loading or unloading operation. FIG. 4 illustrates a loading operation in which a shipping container 440 is being loaded onto a transporter 450. In the illustrated embodiment, the transporter is a utility tractor rig (UTR) 450 pulling a truck chassis 454.

In the illustrated embodiment, the quay crane 410 is physically associated with the cargo and transporter identification code receiving devices. More specifically, the illustrated quay crane 410 includes at least two imaging devices: a cargo identification code imaging device 435, and a transporter identification code imaging device 430. For example, the imaging devices may be video cameras. In the illustrated embodiment, the identification code receiving devices are physically associated with the cargo moving apparatus in that the imaging devices 430 and 435 are physically attached to portions of the quay crane 410. Specifically, the cargo identification code imaging device 435 is attached to the crane's support structure 412 located proximate to the loading/unloading area 460, while the transporter identification code imaging device is attached to the crane's operator booth 414 suspended above the loading/unloading area 460. In one embodiment, the operator booth 414 moves laterally along the boom 416 with the headblock 422. In such an embodiment, identical transporters will generally always be in the same location relative to the operator booth 414 when the headblock is in position to raise or lower the container onto the transporter. Thus, mounting the transporter identification code imaging device 430 to the operator booth 414 in such a situation may make it easier to consistently locate the transporter identification code 455 within the field of view of the imaging device 430.

The cargo identification code imaging device 435 is configured to capture a cargo identification code displayed on an exterior surface of the cargo. In this regard, the illustrated shipping container includes an alphanumeric identification code 445 painted onto or otherwise located on the side of the shipping container 440. As the shipping container 440 is lowered onto the truck chassis 454, the cargo identification code 445 enters the field of view of the cargo identification code imaging device 435. Preferably, the cargo identification code imaging device 435 is positioned and the location of the cargo identification code 445 is standardized such that the cargo identification code 445 naturally enters the imaging device's field of view during a loading or unloading operation. However, in one embodiment, the crane operator 415 can adjust the orientation of the cargo identification code imaging device 435 to capture the cargo identification code 445. When the cargo identification code is in the imaging device's field of view, the imaging device 435 captures the cargo identification code 445. As described above, the cargo transfer monitoring system 200 may then process the captured image to determine identification information or other information from the captured code and to associate the shipping container 440 with the transporter 450.

The transporter identification code imaging device 430 is configured to capture a transporter identification code 455 displayed on an exterior surface of the transporter 450. FIG. 4 illustrates an embodiment of the present invention where the transporter identification code is a two-dimensional barcode 455 located on the roof of the UTR 452. The two-dimensional barcode 455 may be compliant with an ISO (International Organization for Standardization) standard and may be painted on the roof of the UTR or attached to the roof of the UTR 453 using, for example, an adhesive or a magnet. Preferably, the transporter identification code imaging device 430 is positioned and the location of the transporter identification code is standardized such that the transporter identification code 455 is within the field of view whenever the transporter 450 is in the proper position during a loading or unloading operation. However, in one embodiment, the crane operator 415 can adjust the position of the transporter identification code imaging device 430 to capture the transporter identification code 455. When the transporter identification code 455 is in the imaging device's field of view, the imaging device 430 captures the transporter identification code 455. As described above, the cargo transfer monitoring system 200 may then process the captured image to determine transporter identification information or other information from the captured code 455 and to associate the shipping container 440 with the transporter 450.

In one embodiment, a local computer (not shown) on the crane 410 handles at least some of the processing of the identification codes and then communicates the data to the TOS via a communication interface. The communication interface (not shown) may include, for example, a wireless antenna and transceiver coupled to the crane 410. In other embodiments, the actual images captured by the imaging devices are communicated to the TOS or other remote computer system where the images (and the identification codes contained therein) are processed and where the cargo data is associated with the transporter data and/or other contextual data.

Although FIG. 4 illustrates only a single transporter identification code, cargo identification code, transporter identification code receiving device, and cargo identification code receiving device, as described above, the system may include multiple identification codes per transporter, multiple identification codes per cargo, and/or multiple imaging devices.

FIG. 5 provides a more detailed block diagram that illustrates a system 500 for identifying a transporter and cargo during a loading or unloading operation, in accordance with an embodiment of the present invention. The system 500 illustrated in FIG. 5 includes a cargo identification system 595 and a separate transporter identification system 590. Each system includes a local computer, a memory component, a communication interface, a light sensor, an illuminator, and a camera. Although FIG. 5 illustrates separate cargo and transporter identification systems associated with the same cargo moving apparatus, in other embodiments the cargo and transporter identification systems may share at least one device. For example, the crane or other cargo moving apparatus may have only one local computer that processes both cargo and transporter identification codes. Similarly, in some embodiments, any illuminators, light sensors, and/or cameras (or other types of identification code receiving devices) may be used for both capturing transporter identification codes and cargo identification codes.

As illustrated by FIG. 5, the transporter identification system 590 may include a camera 546 to capture the transporter identification code 552. Although FIG. 5 only illustrates one camera in the transporter identification system 590, the system 590 may include more than one camera or other identification code receiving device for capturing the transporter identification code 552. In one embodiment, the local computer 542, which may be a computer on the cargo moving apparatus, is operatively coupled to the camera 546 and is configured to control the zoom, focus, orientation, and/or actuation of the camera 546. The local computer 542 may control the zoom, focus, orientation, and/or actuation of the camera 546 automatically (i.e., without human/manual intervention) or based on input from the crane operator or other system operator.

The transporter identification system 590 also includes a light sensor 548 configured to detect the ambient light proximate the transporter identification code 552 and/or the brightness of the transporter identification code 552. A local computer 542 is operatively coupled to the light sensor 548 and to an illuminator 550 such that the local computer 542 may use the illuminator to illuminate a transporter identification code 552 based on an indication of the ambient light and/or the brightness of the transporter identification code received from the light sensor 548. For example, the illuminator may include a light source or other electromagnetic illumination means for emitting electromagnetic waves, such as visible light, ultraviolet light, microwaves, infrared radiation, and the like. The local computer 542 may be able to turn the illuminator 550 on and off and/or the local computer 542 may be able to control the intensity of the illumination provided by the illuminator 550 beyond simply turning the illuminator 550 on and off.

The system 500 may also include a Programmable Logic Controller (PLC) 580. In a typical crane, the PLC 580 provides the control functions for operation of the crane. As a result, the PLC 580 generally maintains data related the crane's operation, such as crane trolley data (i.e., the horizontal location of the headblock), crane hoist data (i.e., the vertical location of the headblock), and the state of the twist-lock mechanism (i.e., the locking system used to hold the container to the headblock) or other cargo locking mechanism.

As illustrated in FIG. 5, the local computer 542 may be communicatively coupled to the PLC 580 so that data related to the crane's operation during the loading or unloading operation can be communicated to the local computer 542. The local computer 542 may then use this data to control functions such as operation of the illuminator 550, the light sensor 548, and/or the camera 546. For example, the local computer 542 may use the position of the headblock (e.g., hoist and trolley data) to determine where the transporter is located, such as which lane the transporter is in if the cargo moving apparatus services more than one lane. The camera, light sensor, and/or illuminator may then be directed to the determined position of the transporter including, for example, using automated object detection and tracking functionality. Alternatively, the camera, light sensor, and/or illuminator for a particular lane (where there are cameras, sensors, and/or illuminators for each lane or set of lanes) may be actuated. Similarly, the crane's operational data can be used to determine when to attempt to capture the transporter's identification code. For example, the local computer 542 may be able to assume that the transporter is in the loading or unloading area when the headblock is being lowered or raised to or from the loading or unloading area or when the cargo is being unlocked from or locked to the headblock.

In another example, the local computer 542 may use the data relating to the state of the headblock's locking mechanism (or other mechanism of the cargo moving apparatus used to hold the cargo during a loading or unloading operation) to determine when a loading operation begins or ends.

For example, when the PLC data indicates to the local computer 542 that the headblock has locked onto a container, the local computer 542 may use this information to determine that a new loading or unloading operation has begun and, as a result, the local computer 542 may: reset itself, activate the camera/light sensor/illuminator, and/or otherwise prepare for capturing transporter identification information for a new loading or unloading operation. When the PLC data indicates to the local computer 542 that the headblock has unlocked from a container, the local computer 542 may be configured to consider the loading or unloading operation finished and may: communicate any identification data for the loading or unloading operation to the central server 520, reset itself, deactivate the camera/light sensor/illuminator, cease transporter identification operations for the current loading or unloading operation, and/or prepare for capturing transporter identification information for a new loading or unloading operation.

Although not illustrated by FIG. 5, the transporter identification system 590 may include a sensor or other detection device configured for detecting when the transporter is within a predefined loading or unloading area. The local computer 542 may be communicatively coupled to this sensor and configured to operate the camera 546, the light sensor 548, and/or the illuminator 540 whenever the sensor or other detection device detects the presence of the transporter within the predefined loading or unloading area.

The local computer may also associate some or all of the PLC data with the transporter identification information, store the data in the memory component 544, and/or communicate the data to the central server 520 via the communication interface 540.

In one embodiment, when the local computer 542 receives from the camera 546 an image of the transporter identification code 552, the local computer 542 may store the image in a memory component 544 and/or communicate the image via the communication interface 540 to another computer system for processing of the image of the transporter identification code 552.

In another embodiment, when the local computer 542 receives an image of the transporter identification code 552 from the camera 546, the local computer 542 may be configured to conduct at least some of the image processing itself, prior to communicating the identification information to another computer system. In this regard, the local computer 542 may be configured to determine the transporter identification code from the captured image and/or decode the identification code. For example, where the image is of a two-dimensional barcode, the local computer 542 may decode the barcode and, for example, covert it to a binary number or an ASCII character string. In this regard, the local computer 542 may be configure to use a barcode decoding application and/or decoding tables stored in the memory component 544. Where the image is of an alphanumeric code, the local computer 542 may include an OCR application for obtaining the alphanumeric code from the image of the alphanumeric code. The local computer 542 may also be configured to further decode the transporter identification code by comparing the alphanumeric code, the ASCII character string obtained from the barcode, or the like to reference tables or databases stored in the memory component 544. The local computer 542 may then communicate the information it obtains from the transporter identification code 552 and/or other information and send this information to the central server 520.

The local computer 542 may communicate with a central server 520 by, for example, using the communication interface 540 to access a local area network 530 to which the central server 520 is also connected. The LAN 530 may include a wired and/or a wireless LAN. In one embodiment, the local computer 542 receives reference tables and databases from this connection to the central server 520 and stores this reference data in the memory component 544 for use in decoding captured images and transporter identification codes 552.

Where the system 500 includes separate cargo and transportation identification systems, the two systems may generally operate in a similar manner, although the identification codes used to identify the cargo may be of a different type than the identification codes used to identify the transporters. In the illustrated system 500, the cargo identification system 595 includes a camera 566 to capture the cargo identification code 572. Although FIG. 5 only illustrates one camera in the cargo identification system 595, the system 595 may include more than one camera or other identification code receiving device for capturing the cargo identification code 572. In one embodiment, the local computer 562, which may be a computer on the cargo moving apparatus, is operatively coupled to the camera 566 and is configured to control the zoom, focus, orientation, and/or actuation of the camera 566. The local computer 562 may control the zoom, focus, orientation, and/or actuation of the camera 566 automatically (i.e., without human/manual intervention) or based on input from the crane operator or other system operator.

The cargo identification system 595 may also include a light sensor 568 configured to detect the ambient light proximate the cargo identification code 572 and/or the brightness of illumination of the cargo identification code 572. The local computer 562 may be operatively coupled to the light sensor 568 and to an illuminator 570 such that the local computer 562 may use the illuminator 570 to illuminate a cargo identification code 572 based on an indication of the ambient light and/or the brightness of the cargo identification code received from the light sensor 568. As described above, the illuminator may include a light source or other electromagnetic illumination means for emitting electromagnetic waves, such as visible light, ultraviolet light, microwaves, infrared radiation, and the like. The local computer 562 may be able to turn the illuminator 570 on and off and/or the local computer 562 may be able to control the intensity of the illumination provided by the illuminator 570 beyond simply turning the illuminator 570 on and off.

As described above with respect to the local computer 542 for the transporter identification system 590, the local computer 562 of the cargo identification system 595 may be communicatively coupled to the PLC 580 so that data related to the crane's operation during the loading or unloading operation can be communicated to the local computer 562. The local computer 562 may then use this data to control the illuminator 570, the light sensor 568, and/or the camera 566. For example, the local computer 562 may use the position of the headblock (e.g., hoist and trolley data) to determine where the cargo is located. The camera, light sensor, and/or illuminator may then be directed to the determined position of the cargo or, where the camera, light sensor, and/or illuminator are in generally fixed positions, the respective camera, light sensor, and/or illuminator may be actuated when the local computer 562 determines that the cargo or the cargo identification code 572 is within a predefined field of view.

In another example, the local computer 562 may use the data relating to the state of the headblock's locking mechanism (or other mechanism of the cargo moving apparatus used to hold the cargo during a loading or unloading operation) to determine when a loading or unloading operation begins or ends. For example, when the PLC data indicates to the local computer 562 that the headblock has locked onto a container, the local computer 542 may use this information to determine that a new loading or unloading operation has begun and, as a result, the local computer 562 may reset itself, activate the camera/light sensor/illuminator, and/or otherwise prepare for capturing cargo identification information for a new loading or unloading operation. When the PLC data indicates to the local computer 562 that the headblock has unlocked from a container, the local computer 542 may be configured to consider the loading or unloading operation finished and may communicate any identification data for the loading or unloading operation to the central server 520, reset itself, deactivate the camera/light sensor/illuminator, cease cargo identification operations for the current loading or unloading operation, and/or prepare for capturing cargo identification information for a new loading or unloading operation.

The local computer may also associate some or all of the PLC data with captured cargo identification information, store the data in the memory component 564, and/or communicate the data to the central server 520 via the communication interface 560.

Although not illustrated by FIG. 5, the cargo identification system 595 may include a sensor or other detection device configured for detecting when the cargo is within a predefined loading or unloading area. The local computer 562 may be communicatively coupled to this sensor and configured to operate the camera 566, the light sensor 568, and/or the illuminator 570 whenever the sensor or other detection device detects the presence of the cargo within the predefined loading or unloading area.

In one embodiment, when the local computer 562 receives from the camera 566 an image of the cargo identification code 572, the local computer 562 may store the image in a memory component 564 and/or communicate the image via the communication interface 560 to another computer system for processing of the image of the cargo identification code 572.

In another embodiment, when the local computer 562 receives an image of the cargo identification code 572 from the camera 566, the local computer 562 may be configured to conduct at least some of the image processing itself, prior to communicating the identification information to another computer system. In this regard, the local computer 562 may be configured to determine the cargo identification code 572 from the captured image and/or decode the identification code 572. For example, where the image is of a two-dimensional barcode, the local computer 562 may decode the barcode and, for example, covert it to a binary number or an ASCII character string. In this regard, the local computer 562 may be configured to use a barcode decoding application and/or a decoding table stored in the memory component 564. Where the image is of an alphanumeric code, the local computer 562 may include an OCR application for obtaining the alphanumeric code from the image of the alphanumeric code. The local computer 562 may also be configured to further decode the cargo identification code by comparing the alphanumeric code, the ASCII character string obtained from a barcode, or the like to reference tables or databases stored in the memory component 564. The local computer 562 may then communicate the information it obtains from the transporter identification code 572 and/or other information and send this information to the central server 520.

The local computer 562 may communicate with a central server 520 using, for example, the communication interface 560 to access a local area network 530 that the central server 520 is also communicatively coupled to. The LAN 530 may include a wired and/or a wireless LAN. In one embodiment, the local computer 562 receives reference tables and databases from this connection to the central server 520 and stores this reference data in the memory component 564 for use in decoding captured images and cargo identification codes 572. This reference data may originate from the central server 520, the TOS computer 502, or from a remote third-party computer 504.

In one embodiment, the central computer 520 receives cargo identification information and transporter identification information from the cargo identification system 595 and the transporter identification system 590, respectively. The central computer 520 may then be configured to associate the transporter identification information with the cargo identification information received for the same loading or unloading operation. The central server 520 may then be configured to use a network data switch 510 and a LAN 506 to communicate the matched data for each loading or unloading operation to a designated TOS computer 502. The central server 520 may also be configured to use the data switch 510 and a WAN 508 or other communication network structure to communicate the matched data for each loading or unloading operation to one or more remote third-party computers 504. The TOS 502 and/or the remote computers 504 may then use the data to monitor and/or manage cargo loading and/or unloading operations. The central server 520 may be configured to perform other functions such as maintaining and reporting operational status of the system 500 and maintaining history logs.

In one embodiment, the local computers associate contextual information related to the loading or unloading operation, such as a timestamp or a cargo moving apparatus identifier, with the received cargo and transporter identification information. This data may then be communicated to the central computer 520, and the central computer may match the cargo identification data with the transporter identification data by comparing the contextual data associated with each. In other embodiments, the local computers for the cargo and transportation identification systems are the same computer or are part of the same computer system. In such embodiments, the local computer(s) may be configured to associate the cargo identification information with the corresponding transporter identification information. The local computer(s) may then communicate the matched data to the central server 520.

FIG. 6 provides a perspective view of another type of cargo moving apparatus for loading or unloading cargo to or from a vehicle and for receiving transporter and cargo identification codes from the transporter and the cargo, in accordance with an embodiment of the present invention. Specifically, FIG. 6 illustrates a top pick container handler 600 equipped with a cargo identification code receiving device 620 and a transporter identification code receiving device 630. As illustrated, the top pick container handler 600 is loading or unloading a container 610 to or from a transporter 640. The top pick container handler 600 includes a cargo identification code receiving device 620 positioned so that it may capture a representation of a cargo identification code 615 located on the side of the container 610. The cargo identification code receiving device 620 may be configured to automatically capture a representation of the cargo identification code 615 whenever the lift equipment 605 holds a container and raises the container to a particular predetermined position.

The top pick container handler 600 further includes a transporter identification code receiving device 630 positioned so that it may capture a representation of a transporter identification code 645 located on the side of the transporter 640. The transporter identification code receiving device 630 may be configured to capture the transporter identification code automatically at a predetermined time or upon a predetermined event during the loading or unloading operation. In other embodiments, the operator of the top pick container handler 600 may use a user input device to properly position and actuate the transporter identification code receiving device 630. In one embodiment, the transporter identification code receiving device is in a generally fixed position on the top pick container handler 600 and the operator must position the top pick container handler 600 so that the transporter identification code 645 is within the field of view and/or the range of the transporter identification code receiving device 630.

As described above with respect to cargo moving devices generally, in one embodiment the top pick container handler 600 may include a computer system configured to process the received representations of the identification codes. In other embodiments, the top pick container handler 600 merely communicates the received representations of the identification codes to a remote computing system for decoding of the codes, associating the transporter with the cargo and other contextual data, and/or other data processing.

It should be appreciated that embodiments of the present invention may provide for a terminal monitoring and/or management system for managing some or all of the cargo transfers that occur within a shipping terminal. In one embodiment, the cargo and transporter identification system is placed on a dockside crane and manages only the transfer of cargo from a ship to a plurality of transporter vehicles or from a plurality of transporter vehicles to a ship. In other embodiments, however, many if not all of the cargo moving devices in the terminal are equipped with cargo and transporter identification systems or at least cargo and transporter identification code receiving devices. In such an embodiment, the TOS or other central computer system may be able to monitor each and every cargo loading and/or unloading operation that takes place within a shipping terminal. Preferably, the system is substantially automated and provides real-time or near real-time data to a user or a central computer system.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   receiving, at a processor, transporter identifying information associated with a transporter, the transporter identifying information representing a transporter code captured by a transporter identification code capturing device while cargo is being transferred to or from the transporter;
   receiving, at the processor, cargo identifying information associated with the cargo, the cargo identifying information representing a cargo code captured by a cargo identification code capturing device while the cargo is being transferred to or from the transporter;
   generating an association between the transporter identification information and the cargo identification information; and
   managing the movement of one or more vehicles based at least partly on the association that was generated.

2. The method of claim 1 further comprising capturing, by the transporter identification code capturing device, the transporter code that is an alpha numeric code.

3. The method of claim 1 further comprising capturing, by the cargo identification code capturing device, the cargo code that is an alpha numeric code.

4. The method of claim 1 further comprising capturing, by the transporter identification code capturing device, the transporter code transmitted using radio frequency identification signals.

5. The method of claim 1 further comprising capturing, by the cargo identification code capturing device, the cargo code transmitted using radio frequency identification signals.

6. The method of claim 1 further comprising communicating the association to a remote machine.

7. The method of claim 6 further comprising communicating the association to a central computer.

8. The method of claim 6 further comprising communicating the association to a third party.

9. The method of claim 6 further comprising communicating the association to a central server.

10. The method of claim 6 further comprising communicating the association to a terminal operating system.

11. The method of claim 1, wherein managing the movement of the one or more vehicles comprises managing the movement of the transporter.

12. A system, comprising:
a processor configured to:
receive transporter identifying information associated with a transporter, the transporter identifying information representing a transporter code captured by a transporter identification code capturing device while cargo is being transferred to or from the transporter;
receive cargo identifying information associated with the cargo, the cargo identifying information representing a cargo code captured by a cargo identification code capturing device while the cargo is being transferred to or from the transporter; and
generate an association between the transporter identification information and the cargo identification information; and
a terminal operating system configured to:
receive the association; and
manage the movement of one or more vehicles based at least partly on the association that was generated.

13. The system of claim 12, wherein the transporter code is an alpha numeric code.

14. The system of claim 12, wherein the cargo code is an alpha numeric code.

15. The system of claim 12, wherein the transporter identification code capturing device is included in a radio frequency identification system.

16. The system of claim 15, wherein the cargo identification code capturing device is included in an optical character recognition system.

17. The system of claim 12, wherein the cargo code is transmitted using radio frequency identification signals.

18. The system of claim 12 further comprising a communication interface configured to communicate the association to a remote machine.

19. The system of claim 18, wherein the remote machine is a central computer.

20. The system of claim 18, wherein the remote machine is third party device.

21. The system of claim 18, wherein the remote machine is a central server.

22. The system of claim 18, wherein the remote machine is the terminal operating system.

* * * * *